Sept. 25, 1951  D. W. SHERMAN  2,569,118
CARGO-RETAINING ATTACHMENT FOR
HAND-OPERATED FREIGHT TRUCKS
Filed Nov. 7, 1949
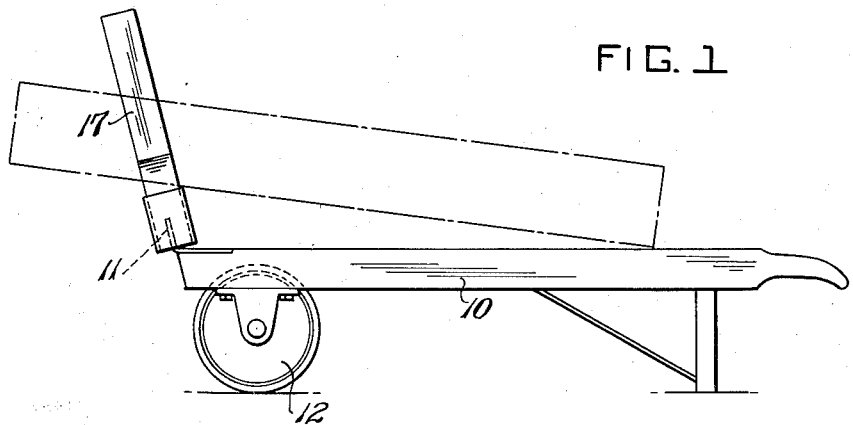
FIG. 1
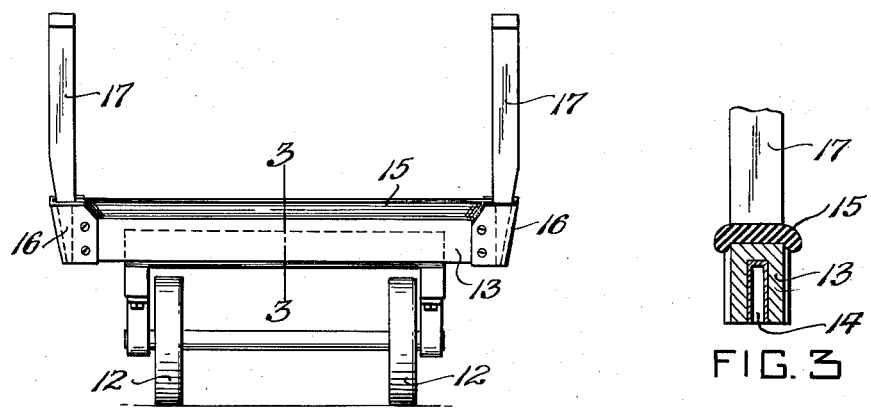
FIG. 2
FIG. 3
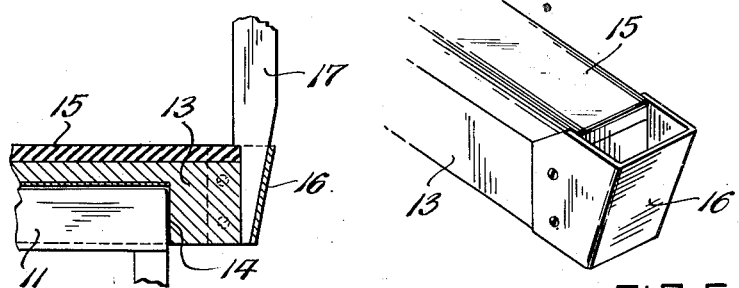
FIG. 4
FIG. 5
INVENTOR.
Dale W. Sherman
BY
W. S. McDowell
ATTORNEY Patented Sept. 25, 1951

2,569,118

UNITED STATES PATENT OFFICE 2,569,118

CARGO-RETAINING ATTACHMENT FOR
HAND-OPERATED FREIGHT TRUCKS

Dale W. Sherman, Columbus, Ohio

Application November 7, 1949, Serial No. 125,927

3 Claims. (Cl. 280—56)

The present invention relates to hand-operated freight trucks, and more specifically to an attachment for hand-operated freight trucks which enable the same to carry or transport a plurality of relatively elongated objects which ordinarily would fall or topple from the freight truck during movement thereof.

In particular, the present invention provides a stake-carrying member adapted to be inserted over and carried upon the blade of a hand freight truck which is normally disposed at the lower or wheel-carrying end of the freight truck to engage the under portion of an object to be carried upon the truck.

Generally, hand-operated freight trucks comprise a relatively flat frame body which terminates at one end in a pair of relatively spaced handle members and at its opposite end in an upwardly turned abutment blade or tongue, with the body being supported at its tongue end by a pair of transversely spaced ground wheels. Normally, the blade or tongue of the freight truck serves as a lever extension for insertion beneath an upstanding object which is to be placed upon the freight truck for transportation. The blade further provides an end abutment which, when the freight truck body is inclined to a carrying position, provides a stop for an object positioned upon the frame body and prevents the object from sliding downwardly from the frame and striking the ground during transportation. In many instances, it becomes necessary to utilize a hand-operated freight truck in transporting a load of loose articles, and in such instances, binding straps or tie-downs are employed to secure the loose articles to the freight truck and thereby prevent spillage during transportation.

It is the principal object of the present invention to provide a relatively simple and inexpensive attachment for freight trucks whereby the latter will be enabled to receive and transport a plurality of loose and relatively elongated articles without fear of having such articles accidentally fall from the truck, and without necessitating the use of binding straps or tie-downs.

It is another object of this invention to provide a side-forming attachment for freight trucks which comprises a body formed with a slotted region to receive the blade or tongue of the truck and provided at either end with socket-forming members for the detachable reception of upstanding side-forming stakes.

For a further and more detailed understanding of the present invention and the various additional objects and advantages realized therefrom, reference is made to the following description and the accompanying drawing, wherein:

Fig. 1 is a side elevational view of a hand-operated freight truck upon which the cargo-retaining attachment of the present invention is operatively installed;

Fig. 2 is a front end elevational view of the freight truck embodying my present attachment;

Fig. 3 is a transverse vertical sectional view taken along the line 3—3 of Fig. 2;

Fig. 4 is an enlarged fragmentary vertical sectional view taken through the end portion of the present freight truck attachment; and Fig. 5 is a fragmentary perspective view of one end of the freight truck attachment.

Referring to the drawing, the numeral 10 generally designates the body portion of a hand-operated freight truck of any suitable construction, the same having a forwardly and perpendicularly disposed end blade 11 extending above and slightly forwardly of the ground wheels 12 of the truck. It will be understood that the present side-forming attachment is intended for use in connection with any suitable type or construction of freight truck which is provided with an upwardly projecting blade member such as that indicated at 11.

The present invention makes use of a block member 13 which is formed upon its under side with a longitudinally extending and downwardly opening socket or recess 14 for the reception of the blade portion 11 of the freight truck. The socket of the block 13 is closed at its respective ends to prevent transverse movement of the block with respect to the freight truck when mounted thereon. Advantageously, the upper surface of the block 13 may be provided with a friction pad or cushion 15 which overlaps a portion of the sides of the block, and which may be formed from any suitable resiliently flexible material, such, for example, as rubber, and which serves as a frictional surface to prevent the sliding movement of objects carried upon the truck outwardly from the forward or lower end of the truck. At either end, the block 13 has attached thereto a pair of socket-forming straps 16 which define with the ends of the block 13 a pair of downwardly tapered sockets for the reception of the cooperatively tapered end portions of a pair of stakes 17.

As will be seen, the stakes 17, when positioned within the sockets formed by the straps 16, project perpendicularly upwardly from the forward end of the freight truck and provide a partial side wall therefor. Thus, in transporting a plurality of objects, such as the cylindrical shapes indicated by broken lines in Fig. 1 of the drawing, the same are prevented from sliding off the forward end of the truck or rolling off the sides of the truck when being transported by nature of the friction pad or cushion 15 and the stakes 17. If desired, when utilizing the truck to transport single relatively large objects, the stakes may be withdrawn from the sockets formed by the straps 16 to permit the object being transported to overhang the sides of the truck without obstruction.

In view of the foregoing, it will be seen that the present invention provides an efficient, yet structurally simple, attachment for hand-operated freight trucks which enables such trucks to be employed in transporting a number of loose articles which would normally be subject to spillage from the truck during transportation in the absence of anchoring straps or tie-downs.

In view of the detachable nature of the attachment and the side stakes therefor, the attachment may be readily removed as a unit from the freight truck simply by withdrawing the same from the blade, and without necessitating the removal of the fastening devices. Freight truck attachments of the type described are characterized by their ease of attachment and operation in connection with standard type freight trucks without requiring modification to the latter, and without impeding the over-all operation of such trucks. Further, by nature of their structural simplicity, such attachments may be provided at relatively low cost to the user.

While a single present preferred embodiment of the invention has been disclosed in detail, it will be manifest that various modifications with regard to constructional details may be accomplished without departing from the spirit of the invention or the scope of the following claims.

I claim:

1. A cargo-retaining attachment for hand-operated freight trucks of the type provided with a cargo-holding blade disposed at the forward end thereof, comprising an elongated body formed on one side with a longitudinally disposed channel for the reception of the blade of a freight truck, a longitudinally disposed cushion of resiliently flexible material carried upon the opposite side of said body and providing a friction-imparting surface for preventing cargo carried upon said truck from slipping longitudinally thereof during transportation, a pair of straps carried at either end of said body and defining therewith a pair of tapered stake-receiving sockets, and a plurality of stakes having a tapered end portion for removable insertion within the sockets formed by said straps.

2. A cargo-retaining attachment for hand-operated freight trucks of the type having a forward transversely disposed cargo-engaging blade, comprising a body for mounting transversely upon the forward end of a freight truck and formed with a channel to receive the blade of the freight truck, a resiliently flexible friction pad carried upon said body on the side thereof opposite said channel for supporting cargo positioned longitudinally on the freight truck and for preventing such cargo from sliding relatively on said truck during transportation thereof, means disposed at either end of said body and defining a plurality of tapered stake-receiving sockets, and a plurality of stakes having tapered end regions for insertion within the sockets disposed at either end of said body, said stakes when inserted within said sockets providing relatively elongated side members extending substantially perpendicularly outwardly from the forward end of a freight truck upon which said body is positioned.

3. A cargo-retaining attachment for hand-operated freight trucks of the type having a transversely disposed cargo-engaging blade at the forward end thereof, comprising a rectangular block member having a slot therein to fit the blade of a freight truck, said block member when positioned upon the blade of a freight truck extending transversely across the forward end of the truck and providing a longitudinal and transverse enlargement on the blade of the truck, a resilient friction pad carried upon a surface of said block member opposite the slot thereof and providing a frictional supporting surface for cargo positioned on the truck, and socket-forming members carried at either end of said block member and defining a plurality of tapered sockets for the reception of side stakes for the truck.

DALE W. SHERMAN.

REFERENCES CITED

The following references are of record in the file of this patent:

UNITED STATES PATENTS

| Number | Name | Date |
|---|---|---|
| 785,867 | Dodds | Mar. 28, 1905 |
| 814,436 | Einfeldt | Mar. 6, 1906 |